US012371043B2

(12) United States Patent
Kim

(10) Patent No.: US 12,371,043 B2
(45) Date of Patent: Jul. 29, 2025

(54) TERMINAL AND SERVER COMMUNICATING THEREWITH

(71) Applicants: Hyundai Motor Company, Seoul (KR); Kia Corporation, Seoul (KR)

(72) Inventor: Hyun Mok Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 18/081,269

(22) Filed: Dec. 14, 2022

(65) Prior Publication Data

US 2023/0322251 A1 Oct. 12, 2023

(30) Foreign Application Priority Data

Apr. 7, 2022 (KR) ........................ 10-2022-0043433

(51) Int. Cl.
*B60W 50/00* (2006.01)
*B60W 50/14* (2020.01)
*G07C 9/25* (2020.01)

(52) U.S. Cl.
CPC ............. *B60W 50/14* (2013.01); *G07C 9/253* (2020.01); *B60W 2050/146* (2013.01)

(58) Field of Classification Search
CPC ........... B60W 50/14; B60W 2050/146; B60W 2040/0809; B60W 50/00; G07C 9/253;
(Continued)

(56) References Cited

U.S. PATENT DOCUMENTS 8,977,408 B1 3/2015 Cazanas et al.
9,401,845 B2 7/2016 Cazanas et al.
(Continued)

FOREIGN PATENT DOCUMENTS

KR 101698516 B1 1/2017
KR 20180044740 A 5/2018
KR 20180105343 A 9/2018

OTHER PUBLICATIONS blog.naver.com [online], "Update Hyundai Motor's Blue Link Navigation and link to the blue link navigation," Apr. 6, 2020, retrieved on Dec. 13, 2022, retrieved from URL<https://blog.naver.com/belfry9/221893650532>, 10 pages (with English Translation).

*Primary Examiner* — Shardul D Patel
(74) *Attorney, Agent, or Firm* — Fish & Richardson P.C.

(57) ABSTRACT

Provided are a terminal that shares user account information and links to another terminal, and a server communicating with the terminal. The terminal provided in a vehicle, when user account information of a user is received from the server through the communicator, stores the received user account information, displays the stored user account information based on at least one of whether the user is present in the vehicle or whether an start command of the vehicle is received, and controls to link to the user terminal using the user account information. Also, the terminal stores user account information of a user input transmits the input user account information to the server, when an authentication request signal is received from the server, displays authentication request information, when an authentication command is received in response to displaying the authentication request information, performs authentication about the user of the vehicle.

20 Claims, 13 Drawing Sheets

(58) Field of Classification Search
CPC ... G07C 9/00571; B60R 16/037; H04L 63/08;
H04W 4/40; H04W 12/06; H04W 12/50;
H04W 12/69
USPC .............................................. 701/1
See application file for complete search history.

(56) References Cited

U.S. PATENT DOCUMENTS

| | | | |
|---|---|---|---|
| 2014/0222298 A1* | 8/2014 | Gurin | G06Q 10/08 701/49 |
| 2016/0075233 A1* | 3/2016 | Chun | B60K 35/00 701/36 |
| 2019/0199800 A1* | 6/2019 | Penilla | G01C 21/3641 |

* cited by examiner

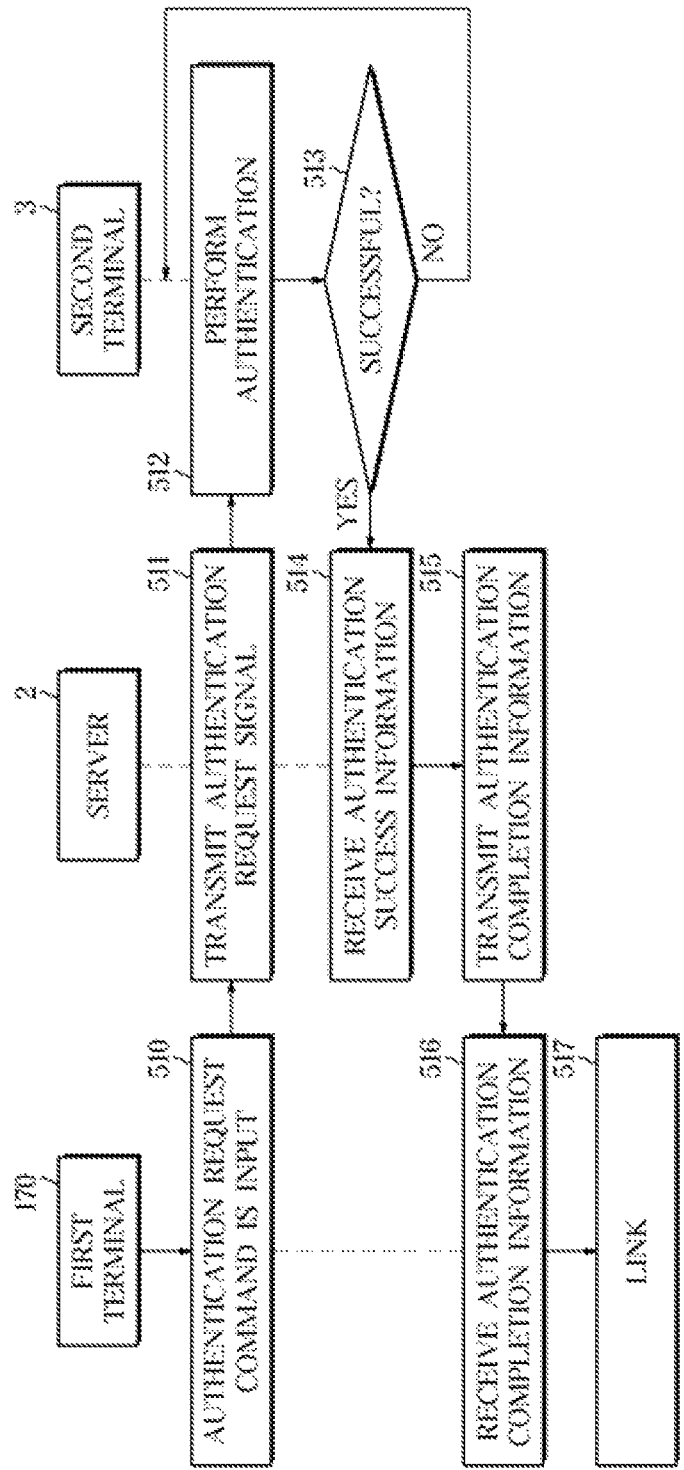

FIG. 7A

Welcome to be a member of Bluelink Family!

Bluelink will serve you with great honor.
To so, I need to connect your Bluelink account.
Start now?

Language >

Start

LATER >

TERMINAL AND SERVER COMMUNICATING THEREWITH

CROSS-REFERENCE TO RELATED APPLICATION

This application is based on and claims priority under 35 U.S.C. § 119 to Korean Patent Application No. 10-2022-0043433, filed on Apr. 7, 2022 in the Korean Intellectual Property Office, the disclosure of which is incorporated herein by reference.

TECHNICAL FIELD

The disclosure relates to a terminal sharing user information and a server communicating therewith.

BACKGROUND

An audio, video, navigation (AVN) terminal mounted on a vehicle provides a user with an audio service (e.g. AM/FM radio, CDP, MP3 player, etc.), a video service (e.g. DMB, satellite TV, etc.), and a navigation service. That is, an AVN terminal provides a user with a variety of multimedia services inside a vehicle.

Various multimedia services may be provided in various ways depending on user's preference, and thus a user may be provided with a customized multimedia service that may be set according to the user's preference in advance.

For example, a user might desire to receive route guidance to a destination the user has searched for before, listen to a radio broadcast of a preset radio channel, or listen to music the user has heard before, through a terminal of the user.

Recently, a service related to connectivity between an AVN terminal in a vehicle and a user terminal (commonly referred to as "vehicle connectivity services") has been provided. Through the vehicle connectivity services, a user may be provided with a service tailored to the user's preference in a vehicle.

For the vehicle connectivity services, a modem may be required to be installed in an AVN terminal, and a user may be required to subscribe to a telecommunications company.

Also, a user may be required to go through several procedures to link an AVN terminal of a vehicle to a user terminal, and change setting information of software or hardware of the AVN terminal of the vehicle. Once the link between the AVN terminal of the vehicle and the user terminal is completed, the user is capable of using information of the user terminal in the vehicle.

Meanwhile, as the sharing economy gradually increases, car-sharing services are becoming more widespread. Similarly to the existing car rental service, a single user may use several vehicles and multiple users may use a single vehicle by the car-sharing service.

In this case, each time a user uses different vehicles, the user may experience inconvenience in order to use vehicle connectivity services fit for the user's taste. For example, each time a user uses different vehicles, the user may be required to link the user's terminal to an AVN terminal, change settings of the AVN terminal, confirm the set status, and the like.

SUMMARY

An aspect of the disclosure provides a terminal that may share user account information and link to another terminal and a server communicating with the terminal.

Additional aspects of the disclosure will be set forth in part in the description which follows and, in part, will be obvious from the description, or may be learned by practice of the disclosure.

According to an aspect of the disclosure, there is provided a terminal provided in a vehicle, the terminal including: a display; a communicator configured to communicate with a server and a user terminal; and a processor configured to, when user account information of a user is received from the server through the communicator, control to store the received user account information, control the display to display the stored user account information based on at least one of whether the user is present in the vehicle or whether a start command of the vehicle is received, and control to link to the user terminal using the user account information.

The processor of the terminal according to an aspect of the disclosure is configured to determine whether the user is present in the vehicle based on at least one of a detection signal of an occupant detector, a door opening signal, a door closing signal received through the communicator and combinations thereof.

When it is determined that the user is present in the vehicle, the processor of the terminal according to an aspect of the disclosure is configured to determine whether the start command is received, and when it is determined that the start command is received, control to display the user account information.

The terminal according to an aspect of the disclosure further includes an inputter; wherein the processor is configured to, when an authentication request command is input through the inputter, transmit an authentication request signal corresponding to the input authentication request command to the server, and when authentication success information is received from the server, control the display to display authentication completion information.

The processor of the terminal according to an aspect of the disclosure is configured to control to link to the user terminal, when an authentication confirmation command is received through the inputter in response to displaying the authentication completion information.

When an authentication confirmation command is received through the inputter before the authentication success information is received from the server, the processor of the terminal according to an aspect of the disclosure is configured to control the display to display notification information about incomplete authentication.

When it is determined that the start command is received, the processor of the terminal according to an aspect of the disclosure is configured to determine whether the user account information is registered, and when it is not determined that the user account information is registered, control the display to display a quick response (QR) code and guide information for guiding membership application.

The processor of the terminal according to an aspect of the disclosure is configured to control the display to display a photo and user account information of at least one user that may be linked to the vehicle, when linking to the user terminal is completed.

The user account information of the user includes at least one of a name, a contact number, a photo, or an email address of the user.

According to another aspect of the disclosure, there is provided a terminal including: an inputter; a display; a communicator configured to communicate with a server and a vehicle; and a processor configured to: control to store user account information of a user input through the inputter, control the communicator to transmit the input user account information to the server, when an authentication request signal is received from the server, control the display to display authentication request information, when an authentication command is received through the inputter in response to displaying the authentication request information, perform authentication about the user of the vehicle, and control the communicator to transmit authentication information corresponding to a result of the authentication to the vehicle through the server.

When a command to access a website is received through the inputter, the processor of the terminal according to another aspect of the disclosure is configured to control to access the website, and control membership registration on the website based on the user account information input through the inputter.

When a command to execute an application is received through the inputter, the processor of the terminal according to another aspect of the disclosure is configured to control to execute the application, and control membership registration through the application based on the user account information input through the inputter.

The processor of the terminal according to another aspect of the disclosure is configured to match and store vehicle identification information, transmitted from the server, with the user account information.

The processor of the terminal according to another aspect of the disclosure is configured to control the communicator to transmit the user account information to the server, when initialization information of a vehicle terminal, provided in the vehicle, is received through the communicator.

When linking to the vehicle is completed, the processor of the terminal according to another aspect of the disclosure is configured to control the communicator to transmit, to the vehicle, information about a function which is being performed.

According to still another aspect of the disclosure, there is provided a server including: a memory; a communicator configured to communicate with a first terminal provided in a vehicle and a second terminal; and a processor configured to: control the memory to store vehicle identification information of the vehicle received from the first terminal, and user account information of a user received from the second terminal, control the communicator to transmit the user account information to the first terminal, control the communicator to transmit an authentication request signal received from the first terminal to the second terminal, and when authentication information is received from the second terminal, control the communicator to transmit the received authentication information to the first terminal.

The processor of the terminal according to still another aspect of the disclosure is configured to control the communicator to transmit the vehicle identification information, received from the first terminal, to the second terminal.

When an authentication confirmation command is received from the first terminal before the authentication information is received from the second terminal, the processor of the terminal according to still another aspect of the disclosure is configured to control the communicator to transmit notification information about incomplete authentication to the first terminal.

The server according to still another aspect of the disclosure further includes an inputter configured to receive the user account information and transmit the user account information to the processor.

When initialization information is received from the first terminal, the processor of the terminal according to still another aspect of the disclosure is configured to confirm the user account information linked to the first terminal, and control the communicator to transmit the confirmed user account information to the first terminal.

BRIEF DESCRIPTION OF THE DRAWINGS

These and/or other aspects of the disclosure will become apparent and more readily appreciated from the following description of the implementations, taken in conjunction with the accompanying drawings of which:

FIGS. 6A and 6B are example flowcharts illustrating operations of controlling a vehicle, a server, and a second terminal according to an implementation; and FIGS. 7A, 7B, 7C, 7D, 7E, and 7F are diagrams illustrating examples of a screen of a first terminal provided in a vehicle according to an implementation.

DETAILED DESCRIPTION

Hereinafter, an operation principle and implementations will be described in detail with reference to the accompanying drawings.

Figure 1:
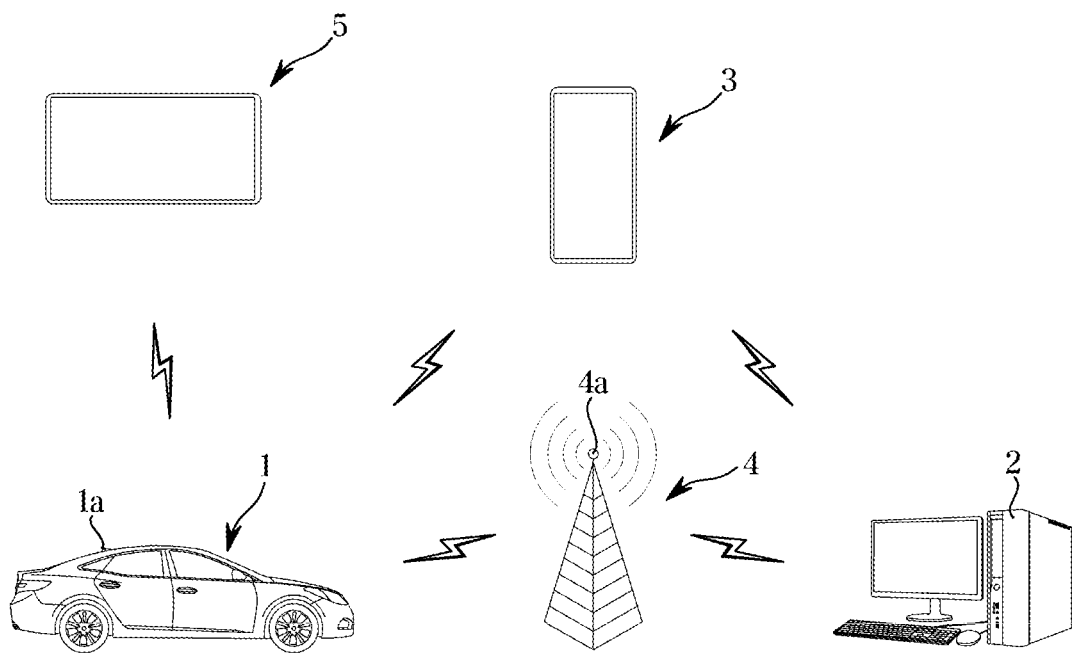
FIG. 1 is a diagram illustrating an example of communication of a vehicle according to an implementation.
Figure 2:
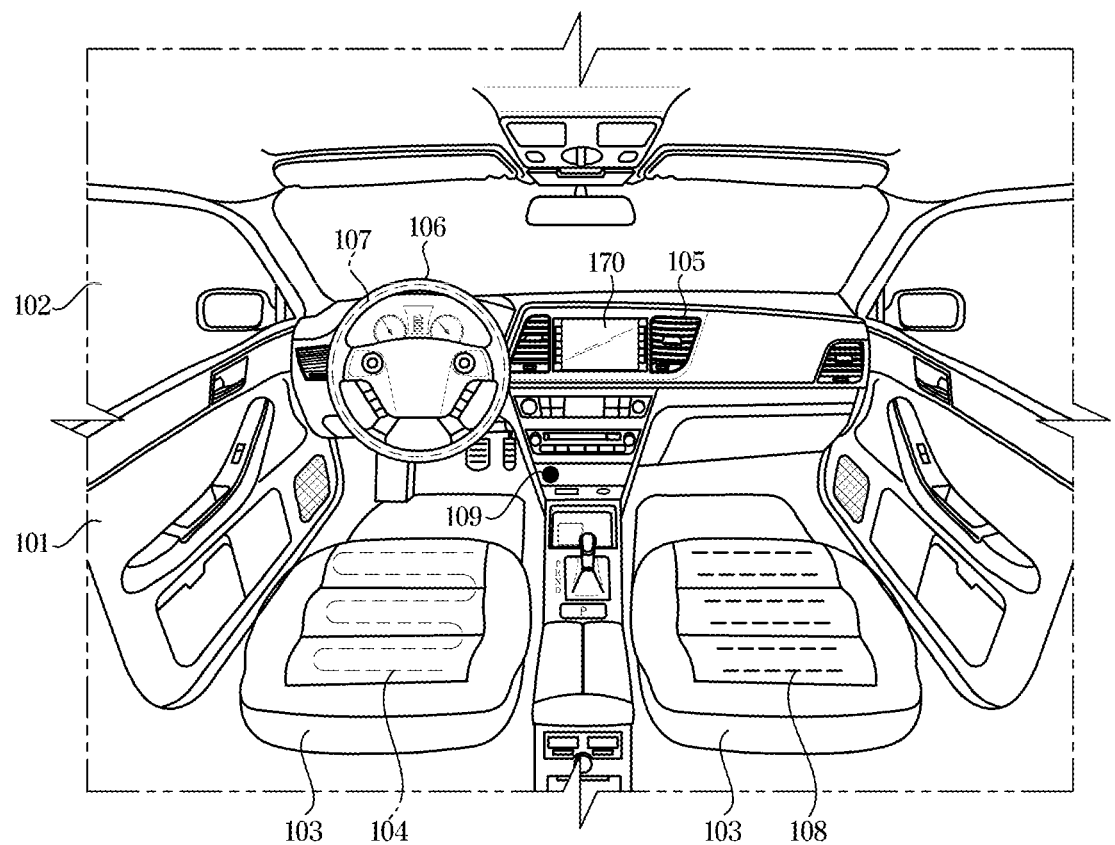
FIG. 2 is a diagram illustrating an example of a vehicle according to an implementation.

FIG. 1 is a diagram illustrating an example of communication of a vehicle according to an implementation. FIG. 2 is a diagram illustrating an example of a vehicle according to an implementation.

FIG. 1 illustrates communication among a vehicle 1, a server 2, a user terminal 3, an infrastructure 4, and a home terminal 5.

The vehicle 1 may radiate electromagnetic waves to an outside through an antenna 1a.

In this case, the antenna 1a of the vehicle 1 may emit an electromagnetic wave corresponding to an electrical signal transmitted from a first processor 190 (refer to FIG. 3) provided in the vehicle 1.

The vehicle 1 receives the electromagnetic wave emitted from at least one of the infrastructure 4, the server 2, the user terminal 3, or the home terminal 5 through the antenna 1a, and converts the received electromagnetic wave to an electrical signal.

The vehicle 1 demodulates the electromagnetic wave received through the antenna 1a and converts into an electrical signal, generates a control signal corresponding to the converted electrical signal, and uses the generated control signal to control the vehicle 1.

The vehicle 1 communicates with the server 2. Also, the vehicle 1 may communicate with the server 2 through the infrastructure 4 on a road.

Here, the server 2 may be a server provided in a service center, manufacturer, auto mechanic, etc., of the vehicle 1. Also, the server 2 may be an application (app) server that provides a service related to the vehicle 1, telematics server, or a platform server.

The vehicle 1 may receive and store user account information from the server 2, and receive and obtain information about the user terminal 3 by linking to the user terminal 3.

Also, the user terminal 3 may provide a remote service through communication with the vehicle 1.

The remote service provides a user with information, received through the server 2, through a terminal 170 (refer to FIG. 3) provided in the vehicle 1, provides a user input received in the vehicle 1 and operation information of the vehicle 1 to the server 2 or the user terminal 3, or controls the vehicle 1 based on the user input received through the user terminal 3.

Through the remote service, the vehicle 1 transmits control information of various electronic devices provided in a home to the home terminal 5, thereby controlling various electronic devices provided in the home or displaying operation information of the various electronic devices provided in the home through the terminal 170 (refer to FIG. 3) inside the vehicle 1.

The remote service may be performed through an application installed in the terminal 170 inside the vehicle, and an application installed in the user terminal 3.

The application may be an application program for linking to the vehicle 1, or an application program that provides the remote service for remotely controlling the vehicle 1.

At least one user terminal 3 may exist.

The user terminal 3 may be implemented as a computer or a portable terminal that may be connected to the vehicle 1 via a network. For example, the computer may include a laptop, desktop, tablet PC, slate PC, etc., equipped with a web browser. Also, the portable terminal is a wireless communication device that guarantees portability and mobility and may include all kinds of handheld-based wireless communication devices such as a personal communication system (PCS), a global system for mobile communication (GSM), a personal digital cellular (PDC), a personal handphone system (PHS), a personal digital assistant (PDA), an international mobile telecommunication (IMT)-2000, a code division multiple access (CDMA)-2000, a wideband CDMA (WCDMA), a wireless broadband Internet (WiBro) terminal, a smartphone, etc., and wearable devices such as a watch, ring, bracelet, anklet, necklace, eyeglasses, contact lenses, or head-mounted-device (HMD), and the like.

The vehicle 1 may receive an electromagnetic wave emitted from the infrastructure 4 on a road, or may emit an electromagnetic wave to the infrastructure 4 on a road.

The infrastructure 4 may receive the electromagnetic wave emitted from the antenna 1*a* of the vehicle 1 through an antenna 4*a*, and obtain information provided by the vehicle 1 or generate a control signal, using an electrical signal corresponding to the received electromagnetic wave.

The infrastructure 4 may be connected to the external server 2 through a separate cable.

When the electrical signal is received from the server 2, the infrastructure 4 may convert the received electrical signal into a control signal or information, convert the converted control signal or information to an electromagnetic wave, and emit the converted electromagnetic wave through the antenna 4*a*. In this instance, a vehicle located around the infrastructure 4 may receive the electromagnetic wave emitted from the infrastructure 4.

The vehicle 1 may include a body having an interior and an exterior, and a chassis where mechanical devices required for driving are mounted as a remaining part other than the body.

The exterior of the body includes a front panel, bonnet, roof panel, and rear panel.

As shown in FIG. 2, the exterior of the body includes a plurality of doors 101 and window glasses 102 (also referred to as "window") provided to each of the doors 101 to be able to be open and closed.

The exterior of the vehicle 1 includes side mirrors for providing a driver with a rear view of the vehicle 1, and a lamp for allowing the driver to easily see surrounding information while keeping an eye on a front and for functioning as a signal or a communication with another vehicle and pedestrians.

The interior of the body may include seats 103 where occupants are seated, a dashboard, and an instrument panel (i.e., a cluster) including a tachometer, speedometer, coolant thermometer, fuel gauge, turn indicator, high beam indicator, warning light, seat belt warning light, odometer, shift lever indicator, door open warning light, engine oil warning light, low oil warning light, etc.

The interior of the body may include a seat heating wire 104 provided in each of the seats 103, and an air conditioner 105 including an air vent and a control panel disposed on a center fascia and performing heat exchange with an air inside the vehicle.

The vehicle 1 may also include a steering wheel 106 for changing a driving direction of the vehicle and a steering wheel heating wire 107 may be further included in the steering wheel 106.

The vehicle 1 may further include a seat ventilation 108 provided in each of the seats 103.

The chassis of the vehicle 1 is a frame supporting the vehicle body, and may include vehicle wheels disposed on four sides of the vehicle, a power device for applying a driving force to the wheels, a steering device, a braking device for applying a braking force to the wheels, and a suspension device.

Figure 3:
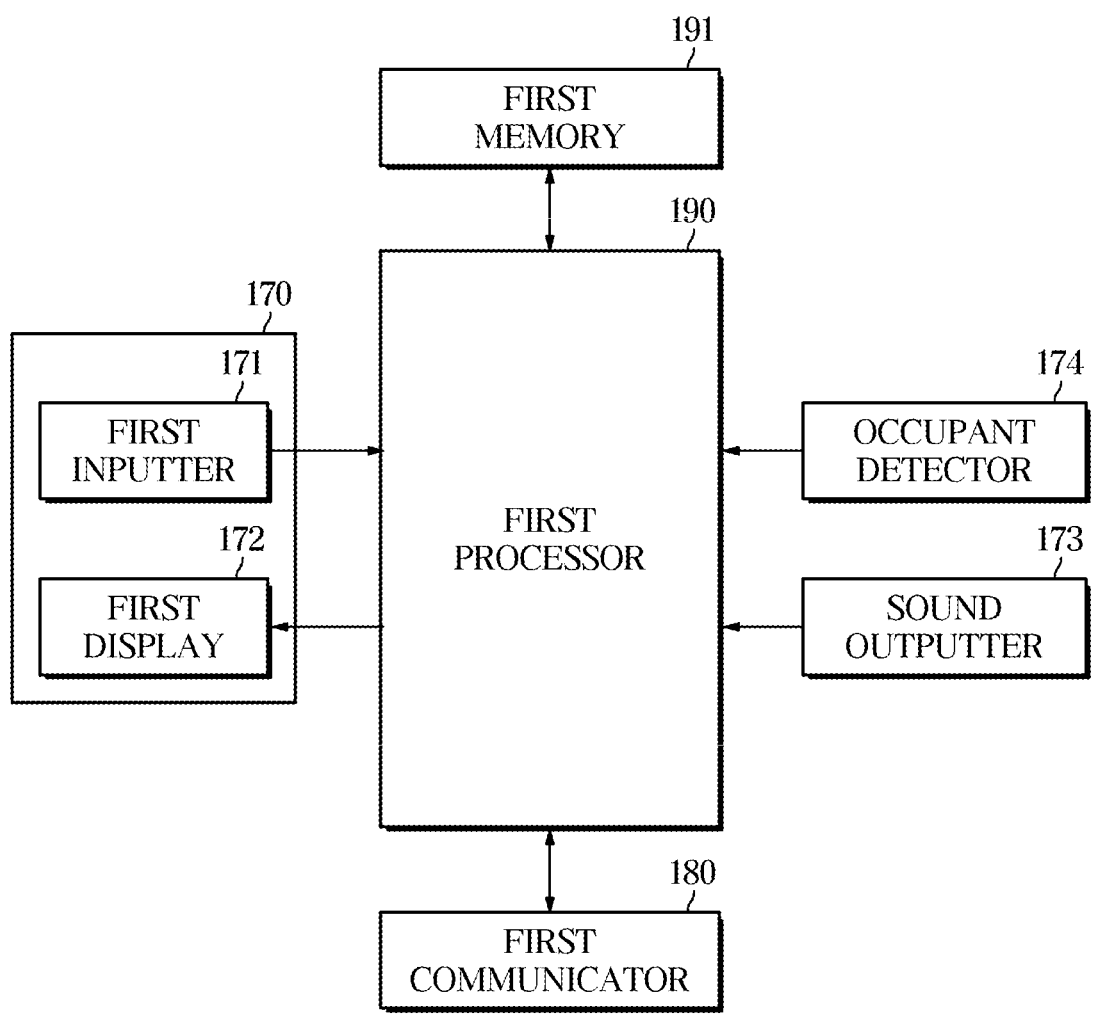
FIG. 3 is a block diagram illustrating an example configuration of a vehicle according to an implementation.

FIG. 3 is a block diagram illustrating a configuration of a vehicle according to an implementation.

As shown in FIG. 3, the vehicle 1 includes the first terminal 170 (also referred to as "AVN terminal" or "vehicle terminal"), a first communicator 180, a first processor 190 and a first memory 191.

To differentiate constituent components of the vehicle 1 from those of the server 2 and the second terminal 3 (also referred to as "user terminal"), the constituent components of the vehicle 1 are referred to as "first" component, the constituent components of the server 2 are referred to as "second" component, and the constituent components of the second terminal 3 are referred to as "third" component.

The first terminal 170 may be embedded in a dashboard or installed on the dashboard to be vertically stood.

The first terminal 170 outputs information about a variety of functions performed in the vehicle 1 and about various functions for user convenience.

For example, the first terminal 170 may output navigation information corresponding to a navigation mode, audio information corresponding to an audio mode, or video information corresponding to a video mode.

The first terminal 170 may be linked to the second terminal 3, receive and output information of the second terminal 3.

For example, the first terminal 170 may display user's schedule information stored in the second terminal 3, output audio information stored in the second terminal 3, or receive destination information stored in the second terminal 3.

The first terminal 170 may perform a remote service for user convenience.

To perform the remote service, the first terminal 170 may communicate with the server 2, the second terminal 3, and the home terminal 5.

Here, the home terminal 5 may be a terminal for controlling various electronic devices provided in a home and for displaying operation information of the various electronic devices in the home. The various electronic devices in the home may include a boiler, air conditioner, lighting device, gas valve of a gas range, television, audio equipment, and the like.

The first terminal 170 may include an application for linking to the second terminal 3, and an application for performing the remote service.

When a navigation mode is selected while the remote service is in operation, the first terminal 170 may transmit current location information and destination information to the server 2, and output navigation information based on route information received from the server 2. The route information received from the server 2 may be changed based on traffic information while driving.

When the vehicle 1 is an autonomous vehicle, the vehicle 1 may control autonomous driving based on the navigation information of the first terminal 170.

When the remote service is in operation, the first terminal 170 may output at least one of news information or weather information received from the server 2, and display operation information of the various electronic devices in the home received through the home terminal 5.

When the remote service is in operation, the first terminal 170 may receive the destination information from the second terminal 3, and receive the user's schedule information from the second terminal 3.

When the remote service is in operation while the vehicle is parked or stopped, the first terminal 170 may receive, from the user terminal 3, at least one of a start command, engine-off command, door lock command, door unlock command, window open command, window close command, seat heating wire on command, seat heating wire off command, ventilation on command, ventilation off command, steering wheel heating on command, steering wheel heating off command, air conditioner on command, or air conditioner off command.

When the remote service is in operation while parked or stopped, the first terminal 170 may further receive, from the user terminal 3, at least one of temperature information of seat heating wire, temperature information of steering wheel heating wire, target temperature information and target ventilation information of air conditioner, or target ventilation information of seat ventilation, and also receive lamp on information, lamp off information, side mirror folding information and side mirror unfolding information.

When the remote service is in operation while parked or stopped, the first terminal 170 may transmit information received from the user terminal 3 to the first processor 190.

The first terminal 170 may include a first display 172, and further include a first inputter 171.

The first terminal 170 may include a display panel as the first display 172, and further include a touch panel as the first inputter 171. That is, the first terminal 170 may include only a display panel, or include a touch screen in which a touch panel is integrated with a display panel. When implemented as a touch screen, the first terminal 170 may directly receive a user's operation command through the touch panel.

When implemented as only a display panel, the first terminal 170 may receive a user's selection through buttons displayed on the display panel using an inputter provided on a head unit or center fascia.

The first inputter 171 receives a user input.

The first inputter 171 receives an operation command of at least one of functions that may be performed in the first terminal 170.

The functions performable in the first terminal 170 may include the remote service function, navigation function, phone call function, broadcast output function, audio function, radio function, Internet function, function of communicating with the second terminal 3, and function of communicating with the home terminal 5, and further include a function of communicating with the server 2.

The first inputter 171 receives an authentication request command for requesting authentication to the server 2, an authentication confirmation command for notifying that a user requires to confirm whether the authentication has been approved, and account selection information for notifying that one of a plurality of accounts has been selected.

The first inputter 171 may receive a link command of the second terminal 3 and a link cancelation command of the second terminal 3.

The first display 172 displays information about a function which is being performed in the vehicle or the first terminal 170.

For example, the first display 172 may display information related to phone call, content output through the user terminal 3, music playback, or external broadcast.

The first display 172 may display an authentication request button image for requesting authentication to the server, an authentication confirmation button image for notifying that the user requires to confirm whether the authentication has been approved, and a plurality of account button images.

The first display 172 may display a link button image of the second terminal 3 and a link cancelation button image of the second terminal 3.

The first display 172 may display authentication failure information and authentication completion information of user account, and display identification information of the second terminal 3.

The first display 172 may display guide information for registration of user account.

When the remote service is in operation, the first display 172 may display remote service information.

The first display 172 may display communication state information with the second terminal 3 and the server 2. That is, the first display 172 may display information about whether communication with the server 2 may be performed and information about whether communication with the second terminal 3 may be performed.

A sound outputter 173 outputs a sound in response to a control command of the first processor 190.

The sound outputter 173 may output a voice in response to notification of receipt of user account information and a voice in response to notification of link to the second terminal 3.

The sound outputter 173 may also output a voice in response to an authentication confirmation request for the user account information.

The sound outputter 173 may include at least one speaker.

The speaker converts an amplified low-frequency audio signal into original sound waves, generates waves of condensation and rarefaction in the air, radiates the sound waves, thereby outputting audio data as sound that a user may hear.

An occupant detector 174 detects a user in a driver's seat to recognize a presence of user in the vehicle and outputs detected information.

The occupant detector 174 may be provided in at least one of seats or seat belts.

For example, the occupant detector 174 may include at least one of a weight sensor, pressure sensor, capacitive sensor or seat belt fastening sensor.

The occupant detector 174 may include a camera provided inside the vehicle.

A first communicator 180 communicates with at least one of the server 2, the infrastructure 4, or the second terminal 3.

The first communicator 180 transmits various information, transmitted from the server 2, the infrastructure 4, and the second terminal 3, to the first processor 190, and transmits the various information to at least one of the server 2, the infrastructure 4, or the second terminal 3, based on a control command of the first processor 190.

The various information may include information related to account registration for registering a user account.

The first communicator 180 may also transmit current location information and destination information to the server 2 based on a control command of the first processor 190.

The first communicator 180 may also transmit, to the home terminal 5, home control information corresponding to a user input, based on a control command of the first processor 190.

The first communicator 180 may include one or more constituent component enabling communication with configuration of the vehicle and various external devices. For example, the first communicator 180 may include at least one of a short-range communication module, a wired communication module or a wireless communication module.

The short-range communication module may include a variety of communication modules capable of transmitting and receiving a signal using a wireless communication network in a short distance, such as Bluetooth module, infrared communication module, radio frequency identification (RFID) communication module, wireless local access network (WLAN) communication module, near field communication (NFC) communication module, zigbee communication module, and the like.

The wired communication module may include a variety of wired communication modules, e.g., controller area network (CAN) communication module, local area network (LAN) communication module, wide area network (WAN) module, or value added network (VAN) module, and a variety of cable communication modules, e.g., universal serial bus (USB), high definition multimedia interface (HDMI), digital visual interface (DVI), recommended standard 232 (RS-232), power line communication, plain old telephone service (POTS), and the like.

The wired communication module may further include a local interconnect network (LIN).

The wireless communication module may include a wireless communication module supporting a variety of wireless communication methods, e.g., Wi-Fi module, wireless broadband module, global system for mobile (GSM) communication, CDMA, WCDMA, universal mobile telecommunications system (UMTS), time division multiple access (TDMA), and long term evolution (LTE).

The first processor 190 may receive the user account information transmitted from the server 2, and store the received user account information in a first memory 191.

The user account information may include a user's contact number (phone number), user's name, user's email address, and user's photo that are provided by the user when the user signs a vehicle contract.

The user account information may be identical to user account information registered through an application installed in the second terminal 3.

The user account information transmitted from the server 2 may be received as event information.

The first processor 190 may control to output the user account information stored in the first memory 191 based on at least one of whether the user is present in the vehicle or whether an start command is received, thereby allowing the user to recognize that the user account information of a new user is stored.

More specifically, when the start command is received through a start button 109 or a remote controller, the first processor 190 controls to start the vehicle, confirms whether the event information received from the server 2 exists, and when it is determined that the event information received from the server 2 exists, confirms the user account information from the event information. Also, the first processor 190 controls the first terminal 170 to output the confirmed user account information.

Based on at least one of a door opening signal, a door closing signal, or a detection signal of the occupant detector 174, the first processor 190 determines whether the user is present in the vehicle, and when it is determined that the user is present in the vehicle, confirms whether the event information received from the server 2 exists, and when it is determined that the event information received from the server 2 exists, confirms the user account information from the event information. Also, the first processor 190 controls the first terminal 170 to output the confirmed user account information.

Based on at least one of a door opening signal, a door closing signal, or a detection signal of the occupant detector 174, the first processor 190 determines whether the user is present in the vehicle, and when it is determined that the user is present in the vehicle, confirms whether the start command is received, and when it is determined that the start command is received, confirms whether the event information received from the server 2 exists. When it is determined that the event information received from the server 2 exists, the first processor 190 confirms the user account information from the event information, and controls the first terminal 170 to output the confirmed user account information.

When it is determined that the event information is received from the server 2, the first processor 190 may determine at least one of whether the user is present in the vehicle or whether the start command is received, and control to output the confirmed user account information.

Here, the event information may include the user account information.

The user account information included in the event information may be different from account information stored in the first memory 191.

When it is determined that the user is present in the vehicle, the first processor 190 displays at least one piece of account information, stored or downloaded, through the first terminal 170 to the user, thereby inducing the user to select one from the at least one piece of account information.

The first processor 190 may determine whether the first terminal 170 has been initialized, and when it is determined that the first terminal 170 has been initialized, request the server 2 for the user account information.

The first processor 190 may determine whether the start command has been received the set number of times, and when it is determined that the start command has been received the set number of times, request the server 2 for the user account information.

The first processor 190 determines account information, selected by the user from the at least one piece of account information, based on a user's input to the first inputter 171, and controls the first communicator 180 to transmit, to the server 2, an authentication request signal for authenticating the determined account information.

When an authentication confirmation command is received through the first inputter 171, the first processor 190 controls the first communicator 180 to transmit the authentication confirmation command to the server 2.

When authentication information is received from the server 2, the first processor 190 controls to output the received authentication information. The authentication information may include authentication success information and authentication failure information.

When it is determined that the authentication is successful based on the received authentication information, the first processor 190 may display link completion information and control to link to the second terminal 3.

When the start command is received, the first processor 190 may determine whether the account information has been registered, and when it is determined that the account information has not been registered through the second terminal 3, control to display a quick response (QR) code and guide information for guiding membership application.

That is, when it is not determined that the user account information is stored in the first memory 191, the first processor 190 may control to display the QR code and the guide information for guiding membership application.

When the authentication confirmation command is received through the first inputter 171 before authentication success, the first processor 190 may control to output notification information for notifying that the authentication is being performed.

When the authentication confirmation command is received through the first inputter 171 before authentication success information is received from the server 2, the first processor 190 may control to output the notification information about incomplete authentication and control to display a screen displayed prior to a screen in which an authentication confirmation command button is displayed.

When the link to the second terminal 3 is completed, the first processor 190 may control to output information of the second terminal 3.

The first processor 190 may control the first terminal 170 to output the information being output in the second terminal 3.

The information being output in the second terminal 3 may include at least one of audio information, video information, or navigation information.

In response to a remote service on command during driving, the first processor 190 may communicate with at least one of the server 2, the infrastructure 4, or the user terminal 3.

In response to the remote service on command during driving, the first processor 190 may control the first communicator 180 to communicate with the home terminal 5.

While a remote service mode is on, in response to a news providing mode, the first processor 190 may control the first display 172 to display news information received from the server 2, and in response to a navigation mode, receive route information from the server 2 and control the first display 172 to display navigation information based on the received route information.

Here, the navigation information may include map information, route information, departure information, destination information, current location information, road environment information, and the like.

While the remote service mode is on, in response to a home control mode, the first processor 190 may control the first communicator 180 to transmit control information input to the first inputter 171 to the home terminal 5, and control the first display 172 to display operation information of various electronic devices inside home received from the home terminal 5.

When an engine-off command is received, the first processor 190 may maintain activation of communication with the server 2, and control to store the event information received during communication with the server 20.

While the vehicle is parked, the first processor 190 may control an operation of at least one electronic device in response to various control commands received from the second terminal 3.

For example, while parked, when the start command is received from the second terminal 3, the first processor 190 may control to start the vehicle. When a door unlock command is received from the second terminal 3, the first processor 190 may control to unlock the door. When an air conditioner on command and target temperature information are received from the second terminal 3, the first processor 190 may control to turn on the air conditioner and control an internal temperature of the vehicle to reach a target temperature.

While parked, when a control command of at least one electronic device is received from the second terminal 3, the first processor 190 may confirm a date and time when the control command of the at least one electronic device is received, and store the confirmed date and time as usage time information of the remote service. In this instance, the first processor 190 may store the control command together as control information, and identification information of the second terminal 3 transmitting the control command may be stored together.

The first processor 190 may be provided in the first terminal 170.

The first processor 190 may be implemented with a memory that stores an algorithm for controlling operations of constituent components of the vehicle or data about a program that reproduces the algorithm, and a processor that performs the above-described operations using the data stored in the memory. In this instance, the memory and the processor may be provided as one chip, or provided as separate chips.

The first memory 191 stores the user account information transmitted from the server 2.

The user account information may include a user's phone number, user's name, user's email address, and user's photo that are provided by the user when the user signs a vehicle contract, and may further include identification information of the second terminal.

The user account information may be identical to user account information registered through an application installed in the second terminal 3.

The user account information may include account information about each of at least one user.

The first memory 191 may store vehicle identification information, user identification information for each user, and identification information of a second terminal of each user, and also store identification information of the home terminal 5.

The first memory 191 may be implemented with at least one of a non-volatile memory such as cache, read only memory (ROM), programmable read only memory (PROM), erasable programmable read only memory (EPROM), electrically erasable programmable read only memory (EEPROM) and flash memory, a volatile memory such as random access memory (RAM) and storage medium such as hard disk drive (HDD) and compact disc read only memory (CD-ROM), without being limited thereto.

The constituent components shown in FIG. 3 refers to a software and/or hardware component such as a field-programmable gate array (FPGA) or an application-specific integrated circuit (ASIC).

Figure 4:
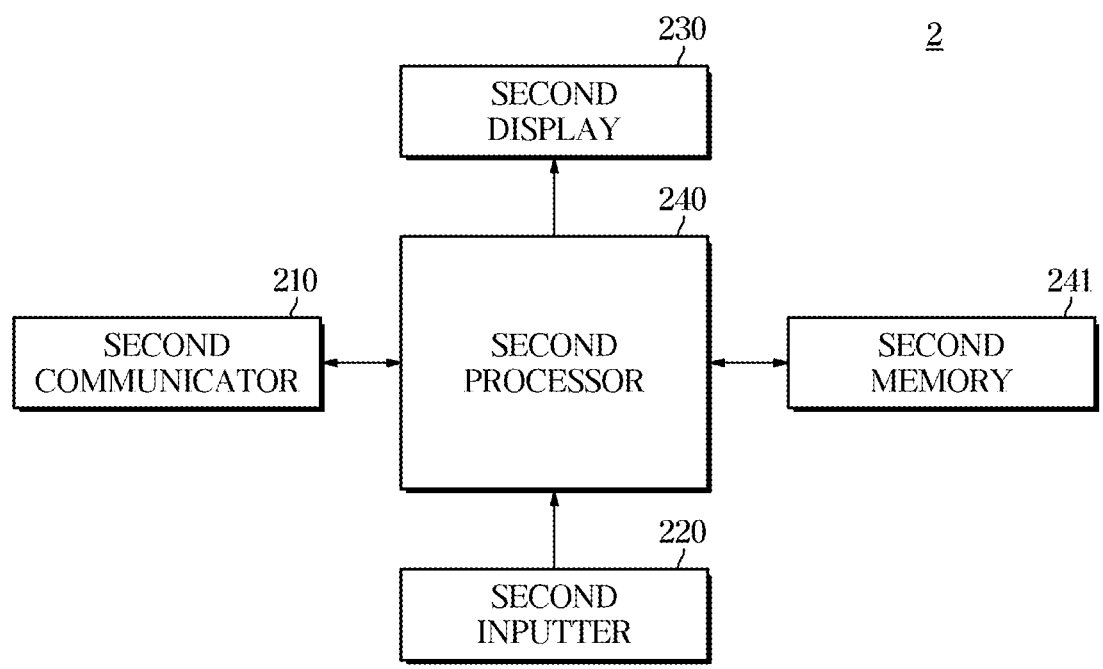
FIG. 4 is a block diagram illustrating an example configuration of a server communicating with a vehicle according to an implementation.

FIG. 4 is a block diagram illustrating a configuration of the server 2 communicating with a vehicle according to an implementation.

The server 2 includes a second communicator 210, a second inputter 220, a second display 230, a second processor 240, and a second memory 241.

The second communicator 210 may communicate with the vehicle 1 and the second terminal 3.

The second communicator 210 may receive vehicle identification information, identification information of the second terminal 3, and user account information, when communicating with the vehicle 1 or the second terminal 3.

The vehicle identification information may include a communication serial number, a registration number, and an owner's name of the vehicle.

The identification information of the second terminal 3 may include a phone number, a user's name, identification number, communication serial number, model name, etc., of the terminal.

The second communicator 210 may include a wired communication module and a wireless communication module. Types of the wired communication module and wireless communication module are the same as the first communicator 180, and thus a description thereof is omitted.

The second communicator 210 may communicate with the vehicle 1 and the second terminal 3 through the infrastructure 4.

The second communicator 210 may transmit information, transmitted from the first terminal 170 of the vehicle 1, to the second processor 240, and transmit information, transmitted from the second terminal 3, to the second processor 240.

The second communicator 210 may transmit information to at least one of the first terminal 170 of the vehicle 1 or the second terminal 3, according to a control command of the second processor 240.

The second inputter 220 receives a user input. Here, the user input may be an input from a server administrator.

The second inputter 220 may receive user account information for user registration.

For example, the second inputter 220 may receive vehicle identification information, identification information of the second terminal 3, and user account information of a user that possesses the second terminal 3.

The second display 230 may display an image for user registration.

The second processor 240 controls to store the user account information input to the second inputter 220.

When the vehicle identification information is received from the vehicle 1, the second processor 240 controls to store the received vehicle identification information, together with identification information of at least one user linked to the vehicle 1.

The second processor 240 may control to store user identification information and vehicle identification information registered when signing a contract of the vehicle 1.

The user identification information may include a phone number, name, member ID of user.

When the vehicle identification information and the user identification information is received from the vehicle 1, the second processor 240 may control the second communicator 210 to transmit the vehicle identification information to the second terminal 3 linked to the vehicle 1.

When the user account information is received from the second terminal 3, the second processor 240 confirms at least one of the user identification information or the identification information of the second terminal 3, based on the received user account information, confirms identification information of a vehicle linked to the user or the second terminal 3 based on at least one of the confirmed user identification information or the confirmed identification information of the second terminal 3, and transmits the user account information to the vehicle 1 having the confirmed vehicle identification information.

The user account information may include a user's phone number, user's member ID, user's name, user's email address, and user's photo, and may further include identification information of the second terminal and the vehicle identification information.

The second processor 240 may transmit the user account information, received from the second terminal 3, to the vehicle 1, as event information, thereby allowing the user to recognize an occurrence of an event.

When account information selected by the user and an authentication request signal are received from the vehicle 1, the second processor 240 confirms the identification information of the second terminal based on the received account information, and controls the second communicator 210 to transmit the authentication request signal to the second terminal 3 having the confirmed identification information of the second terminal.

When transmitting the authentication request signal to the second terminal 3, the second processor 240 may transmit the authentication request signal through a short message service (SMS) or PUSH notification method.

When authentication success information is received from the second terminal 3, the second processor 240 controls the second communicator 210 to transmit the received authentication success information to the vehicle 1.

When authentication failure information is received from the second terminal 3, the second processor 240 controls the second communicator 210 to transmit the received authentication failure information to the vehicle 1.

When an authentication confirmation command is received from the vehicle 1, the second processor 240 controls the second communicator 210 to transmit authentication information to the vehicle 1.

When the authentication confirmation command is received from the vehicle 1, the second processor 240 controls the second memory 241 to store link completion information between the vehicle 1 and the second terminal 3.

When the authentication confirmation command is received from the vehicle 1, the second processor 240 may determine whether the authentication is successful, and when it is determined that the authentication confirmation command is received before authentication success, control the second communicator 210 to transmit notification information about incomplete authentication to the vehicle 1.

When initialization information of the first terminal 170 is received from the vehicle 1, the second processor 240 may confirm the user account information including the vehicle identification information of the vehicle 1, and control the second communicator 210 to transmit the confirmed user account information to the vehicle 1.

The second processor 240 may control a remote service with the vehicle 1, and control relay of remote service between the vehicle 1 and the second terminal 3.

The second memory 241 may store identification information of registered user and the vehicle identification information, and further store the identification information of the second terminal.

The second memory 241 may store the user account information.

The server 2 described above may be divided into a server storing the user account information, and a server managing communication with the vehicle.

The constituent components shown in FIG. 4 refers to a software and/or hardware component such as a field-programmable gate array (FPGA) or an application-specific integrated circuit (ASIC).

Figure 5:
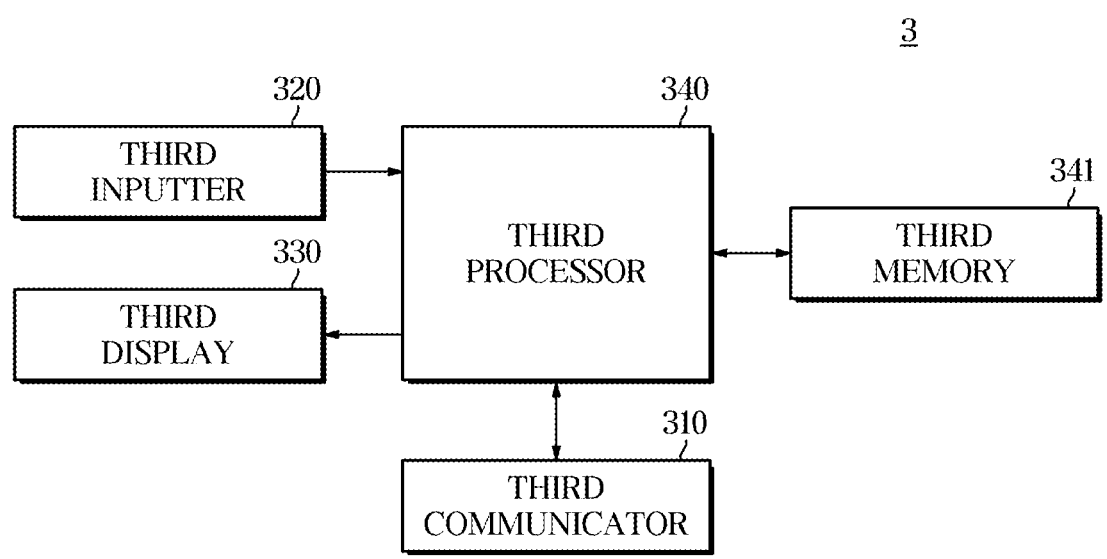
FIG. 5 is a block diagram illustrating an example configuration of a second terminal communicating with a vehicle and a server according to an implementation.

FIG. 5 is a block diagram illustrating a configuration of the second terminal 3 communicating with the server 2 and the vehicle 1 according to an implementation.

The second terminal 3 includes a third communicator 310, a third inputter 320, a third display 330, a third processor 340 and a third memory 341.

The third communicator 310 may communicate with the vehicle 1 and the server 2.

When communicating with the server 2, the third communicator 310 may receive vehicle identification information from the server 2, and transmit identification information of the second terminal 3 and user account information to the server 2.

The vehicle identification information may include a communication serial number, registration number, owner's name (i.e., user's name), user's residential information, user's phone number, etc., of the vehicle.

The identification information of the second terminal may include a user's name, identification number, communication serial number, model name, phone number, etc., of the terminal.

When linked to the vehicle 1, the third communicator 310 may transmit information stored in the second terminal 3 and information about a function being performed in the second terminal, to the vehicle 1, and when a remote service is in operation, transmit a remote control command to the vehicle 1.

The third communicator 310 may include a wired communication module and a wireless communication module. Types of the wired communication module and wireless communication module are the same as the first communicator 180, and thus a description thereof is omitted.

The third communicator 310 may communicate with the vehicle 1 and the server 2 through the infrastructure 4.

The third inputter 320 receives a user input.

The third inputter 320 receives a command to execute an application for linking to the vehicle 1 or the first terminal 170 of the vehicle 1, and user information for user registration.

Here, the user information may be information about a user that uses the vehicle.

The user information may include member ID information and password information, and may further include user account information. The user account information may include a name, address, home phone number, photo, and email address of the user, a phone number of the second terminal, and the like.

The third inputter 320 may receive an authentication command corresponding to an authentication request signal of the server 2.

The third inputter 320 may receive a command to execute an application for remote service.

The third display 330 may display an image of application running and information corresponding to a user's input to the third inputter 320.

The third processor 340 controls the application execution, and when membership registration is completed, may control the third communicator 310 to transmit the user account information registered through the application and the identification information of the second terminal 3 to the server 2.

The third processor 340 may control to display the vehicle identification information received from the server 2 through the application.

When the vehicle identification information is received from the server 2, the third processor 340 may control activation of application for linking to the vehicle 1, and switch to a membership registration standby state.

When membership registration is made through the application, the third processor 340 may control to store the user account information input through the third inputter 320, and control the third communicator 310 to transmit the input user account information to the server 2.

When a membership registration command of the application is input through the third inputter 320, the third processor 340 may control to display a membership registration image, control to store the user account information input through the third inputter 320, and control the third communicator 310 to transmit the input user account information to the server 2.

When a command to execute a website and the membership registration command are received, the third processor 340 may control to display the membership registration image, control to store the user account information input through the third inputter 320, and control the third communicator 310 to transmit the input user account information to the server 2.

When the authentication request signal is received from the server 2, the third processor 340 may control to display authentication request information, and when the authentication command is input through the third inputter 320, control the third communicator 310 to transmit the input authentication command to the server 2.

When the authentication is successful, the third processor 340 may transmit authentication success information to the server 2, and when the authentication fails, transmit authentication failure information to the server 2.

The authentication request information may be an authentication message received using a short message service (SMS) or PUSH notification method. That is, the third processor 340 may control to display the SMS-based authentication message or the PUSH-based authentication message.

When linking to the vehicle 1 is completed, the third processor 340 may transmit information about a function being performed in the second terminal 3 to the vehicle 1.

For example, the third processor 340 may transmit schedule information stored in the second terminal 3 to the vehicle 1, or when a music play function is in operation, transmit audio information to the vehicle 1.

In response to receiving a command to change user account information, the third processor 340 may control the third display 330 to display an image for changing the registered user account information, and transmit the user account information input through the third inputter 320 to the server 2, together with the command to change the user account information.

While the remote service is in operation, the third processor 340 may transmit a vehicle control command input to the third inputter 320 to the vehicle 1.

The third memory 341 stores the vehicle identification information, the identification information of the second terminal 3, and the user account information.

The third memory 341 may be implemented with at least one of a non-volatile memory such as cache, read only memory (ROM), programmable read only memory (PROM), erasable programmable read only memory (EPROM), electrically erasable programmable read only memory (EEPROM) and flash memory, a volatile memory such as random access memory (RAM) and storage medium such as hard disk drive (HDD) and compact disc read only memory (CD-ROM), without being limited thereto.

The constituent components shown in FIG. 5 refers to a software and/or hardware component such as a field-programmable gate array (FPGA) or an application-specific integrated circuit (ASIC).

Figure 6A:
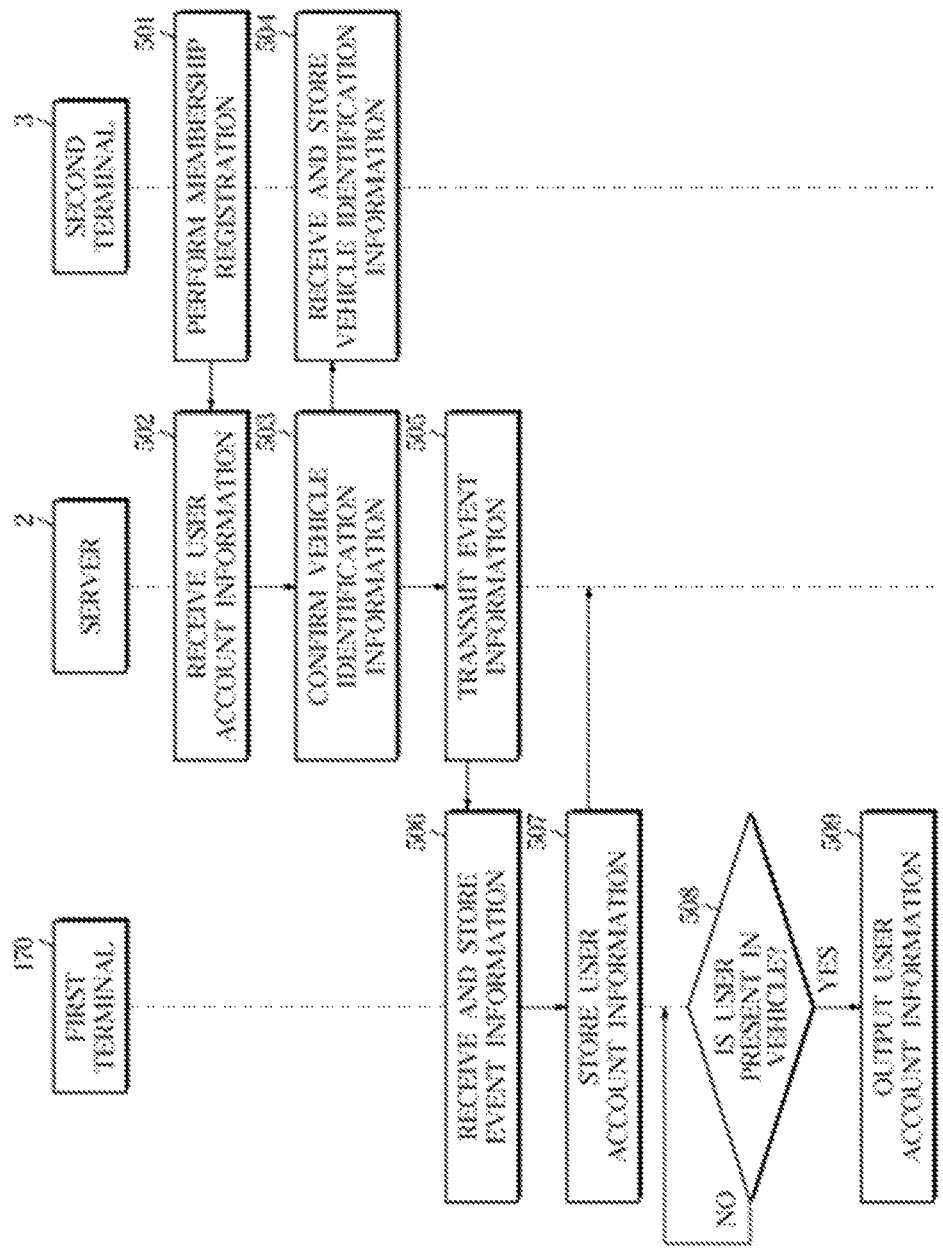

FIGS. 6A and 6B are example flowcharts illustrating operations of controlling a vehicle, a server, and a second terminal.

FIGS. 7A, 7B, 7C, 7D, 7E, and 7F are diagrams illustrating examples of a screen of a first terminal provided in a vehicle according to an implementation.

When purchase information of the vehicle 1 is received from a server of a vehicle selling store, the server 2 may obtain vehicle identification information and user identification information from the purchase information of the vehicle 1, and store the obtained vehicle identification information and user identification information.

As shown in FIG. 7A, when an start command is received, the first terminal 170 of the vehicle may determine whether account information has been registered, and when it is not determined that a user has registered the account information through the second terminal 3, display guide information for guiding membership application.

Figure 7B:
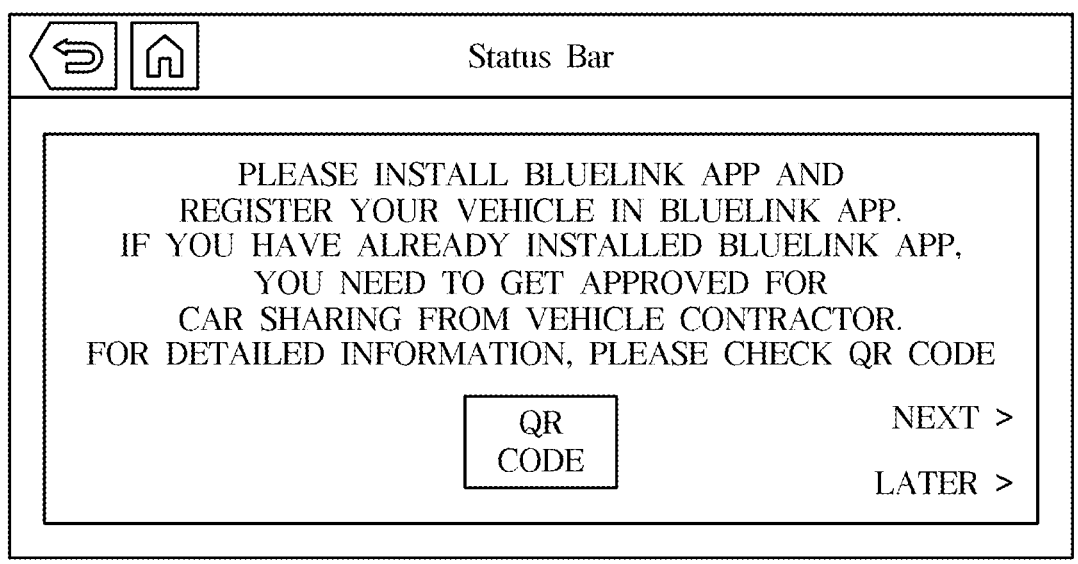

As shown in FIG. 7B, when it is not determined that the user has registered the account information through the second terminal 3, a QR code for guiding membership application may be displayed.

That is, when it is not determined that user account information is stored in the first memory 191, the first terminal 170 may display the guide information and the QR code for guiding membership application.

When a command to execute an application is received through the third inputter 320, the second terminal 3 controls to execute the application and displays a screen of the application. When a membership registration (or membership application) command is received through the third inputter 320, the second terminal 3 may display a membership registration screen.

When a command to access a website is received through the third inputter 320, the second terminal 3 controls to access the website, and displays a screen of the website. When a membership registration (or membership application) command is received through the third inputter 320, the second terminal 3 may display a membership registration screen.

The second terminal 3 receives information required for membership registration through the third inputter 320 via the membership registration screen displayed on the third display 330, and perform membership registration (501) of the user based on the information input through the third inputter 320.

When performing membership registration, the second terminal 3 may receive user account information through the third inputter 320 and store the received user account information, thereby completing membership registration.

The user account information may include a member ID and a password of the user for accessing the application or website, and also include a phone number, name, social security number, email address, photo, etc., of the user. Also, the user account information may further include vehicle identification information and identification information of the second terminal.

The second terminal 3 transmits the user account information to the server 2.

The server 2 receives the user account information (502) transmitted from the second terminal 3, and stores the received user account information.

Next, when the user account information is received, the server 2 may confirm the user identification information from the user account information, confirm the vehicle identification information corresponding to the user identification information (503), and transmit the confirmed vehicle identification information to the second terminal 3.

In this instance, the second terminal 3 may store the vehicle identification information together with the user account information (504).

The user identification information may include at least one of a name, social security number, phone number, or member ID of the user.

Also, the second terminal 3 may directly receive the vehicle identification information through the third inputter 320.

When initialization information of the first terminal 170 is received, the server 2 may transmit the vehicle identification information to the second terminal 3.

When the user account information is received from the second terminal 3, the server 2 confirms at least one of the user identification information or the identification information of the second terminal 3, based on the received user account information, and confirms identification information of a vehicle linked to the user or the second terminal 3 based on at least one of the confirmed user identification information or the confirmed identification information of the second terminal 3. Also, the server 2 transmits the user account information to the vehicle 1 having the confirmed vehicle identification information, i.e., transmits the user account information to the first terminal 170 of the vehicle 1 as event information (505).

The first terminal 170 of the vehicle 1 may receive the event information transmitted from the server 2 (506), confirm the user account information from the received event information, and store the confirmed user account information in the first memory 191 (507).

The first terminal 170 of the vehicle 1 may determine whether the user is present in the vehicle (508), and when it is determined that the user is present in the vehicle, output the user account information stored in the first memory 191 (509).

Here, whether the user is present in the vehicle may be determined based on at least one of a door opening signal, a door closing signal, or a detection signal of the occupant detector 174.

More specifically, based on at least one of the door opening signal, the door closing signal, or the detection signal of the occupant detector 174, the first terminal 170 determines whether the user is present in the vehicle, and when it is determined that the user is present in the vehicle, confirms whether the event information received from the server 2 exists. When it is determined that the event information received from the server 2 exists, the first terminal 170 confirms the user account information from the event information, and outputs the confirmed user account information.

When an start command is received, the first terminal 170 of the vehicle 1 may output the user account information stored in the first memory 191.

More specifically, when the start command is received through the start button 109 or a remote controller, the first terminal 170 controls to start the vehicle, and confirms whether the event information received from the server 2 exists. When it is determined that the event information received from the server 2 exists, the first terminal 170 confirms the user account information from the event information and outputs the confirmed user account information.

Also, based on at least one of a door opening signal, a door closing signal, or a detection signal of the occupant detector 174, the first terminal 170 may determine whether the user is present in the vehicle, and when it is determined that the user is present in the vehicle, confirm whether an start command is received. When it is determined that the start command is received, the first terminal 170 may confirm whether the event information received from the server 2 exists. When it is determined that the event information received from the server 2 exists, the first terminal 170 may confirm the user account information from the event information, and output the confirmed user account information.

Figure 7C:
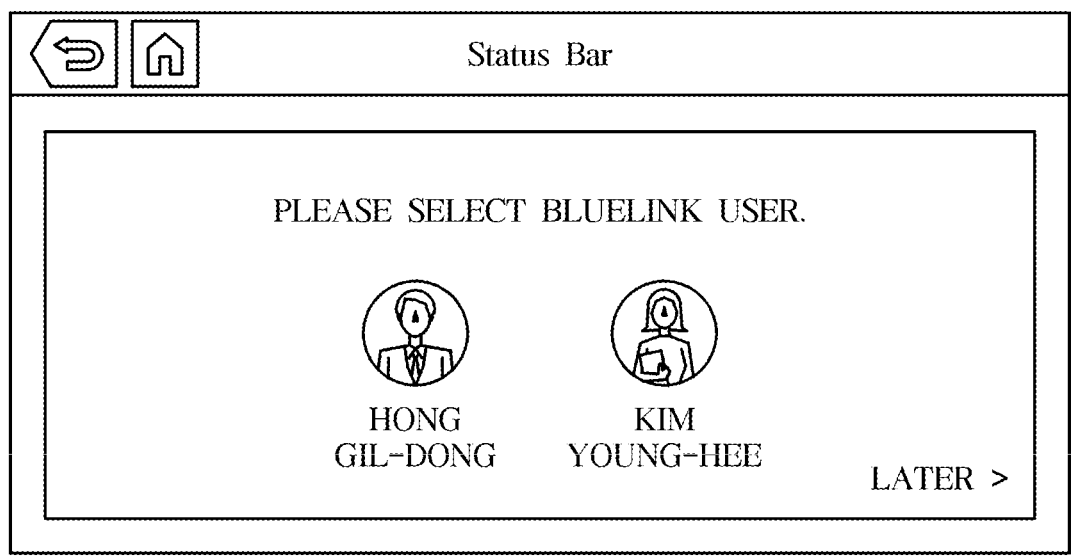

As shown in FIG. 7C, when it is determined that the user is present in the vehicle, the first terminal 170 may display at least one piece of account information, stored or downloaded, through the first display 172 to the user, thereby inducing the user to select one from the at least one piece of account information.

Based on a user's input to the first inputter 171, the first terminal 170 determines account information selected by the user from the at least one piece of account information, and displays an authentication request command button for authentication of the determined account information on the first display 172.

Figure 7D:
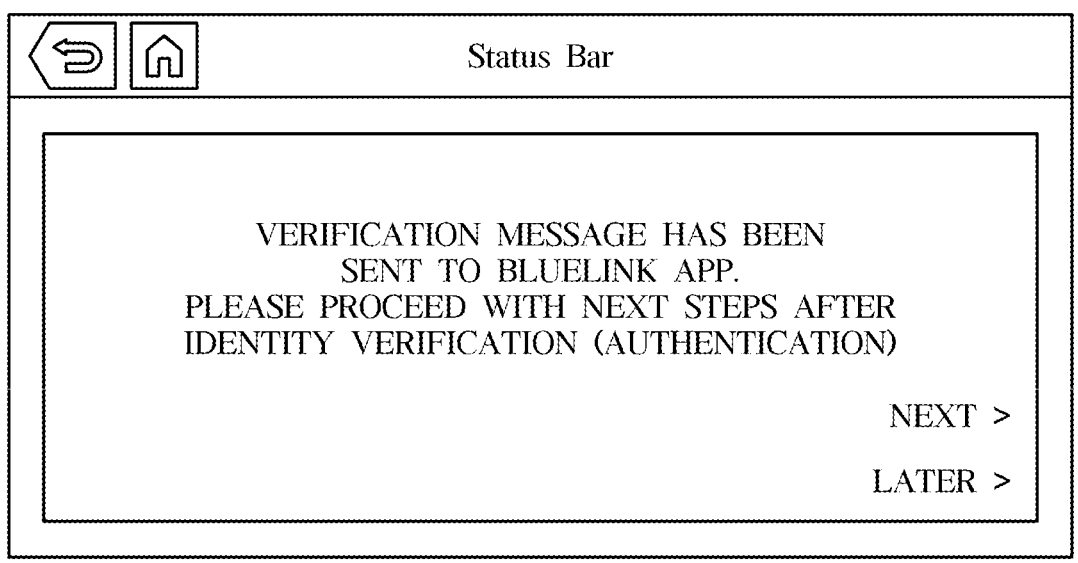

As shown in FIG. 7D, when an authentication request command is input through the first inputter 171 (510), the first terminal 170 transmits an authentication request signal corresponding to the input authentication request command to the server 2. The authentication request command may be for verifying the user.

When transmitting the authentication request signal to the server 2, the first terminal 170 may further transmit the vehicle identification information and the user account information.

When the authentication request signal is received from the first terminal 170, the server 2 transmits the received authentication request signal to the second terminal 3 (511). When transmitting the authentication request signal, the server 2 may further transmit the vehicle identification information and the user account information.

When the authentication request signal is received, the second terminal 3 performs authentication (512).

When the authentication request signal is received, the second terminal 3 may compare the received vehicle identification information and user account information with information stored in the third memory 341 and determine whether to match each other, in order to perform authentication.

When the authentication request signal is received, the second terminal 3 may confirm the vehicle identification information received through the server 2, and compare the confirmed vehicle identification information with vehicle identification information stored in the third memory 341. When the confirmed vehicle identification information and the vehicle identification information stored in the third memory 341 match, the second terminal 3 may determine that the authentication is successful, and when the confirmed vehicle identification information and the vehicle identification information stored in the third memory 341 do not match, the second terminal 3 may determine that the authentication fails.

When the authentication request signal is received, the second terminal 3 may confirm the user account information received through the server 2, and when the confirmed user account information and user account information stored in the third memory 341 match, determine that the authentication is successful. When the confirmed user account information and the user account information stored in the third memory 341 do not match, the second terminal 3 may determine that the authentication fails.

When it is determined that the authentication is successful, the second terminal 3 transmits authentication success information to the server 2 (513).

When the authentication success information is received (514), the server 2 transmits authentication completion information to the first terminal 170 of the vehicle (515).

When the authentication completion information is received (516), the first terminal 170 of the vehicle displays link completion information and links to the second terminal 3 (517).

When an authentication confirmation command is received through the first inputter 171, the first terminal 170 of the vehicle may transmit the authentication confirmation command to the server 2.

When the authentication confirmation command is received through the first inputter 171 before authentication success, the first terminal 170 of the vehicle may display notification information for notifying that the authentication is being performed.

When the authentication confirmation command is received through the first inputter 171 before the authentication success information is received from the server 2, the first terminal 170 of the vehicle may control to output notification information about incomplete authentication and control to display a screen displayed prior to a screen in which an authentication confirmation command button is displayed.

Figure 7E:
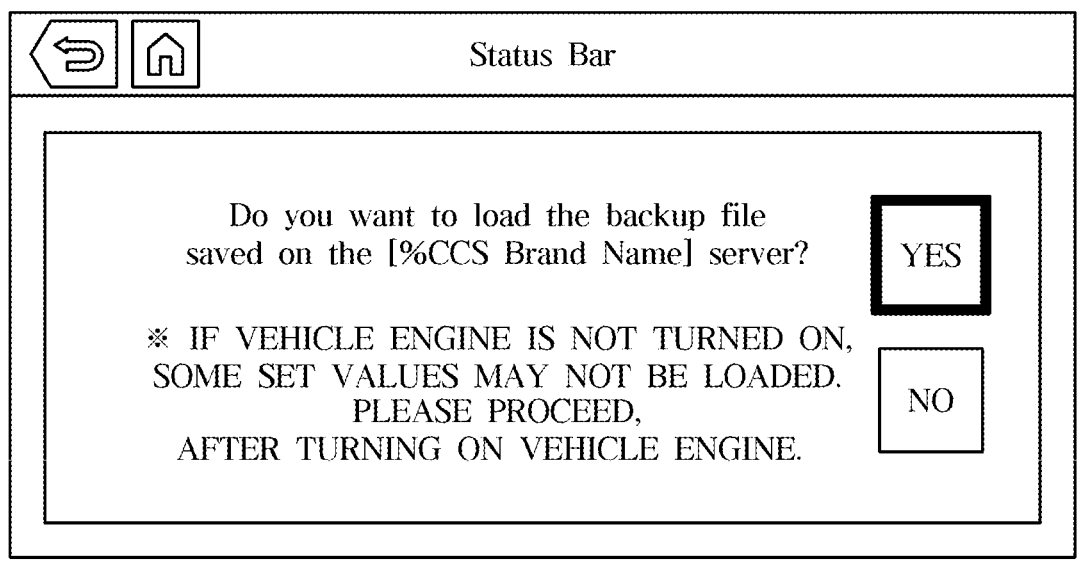

As shown in FIG. 7E, before the link to the second terminal 3 is completed, the first terminal 170 of the vehicle may display a screen for receiving a backup file from the server 2, and when a consent (YES) command is received through the third inputter 320, receive and display the backup file stored in the server 2.

When the link to the second terminal 3 is completed, the first terminal 170 of the vehicle may control to output information of the second terminal 3.

Figure 7F:
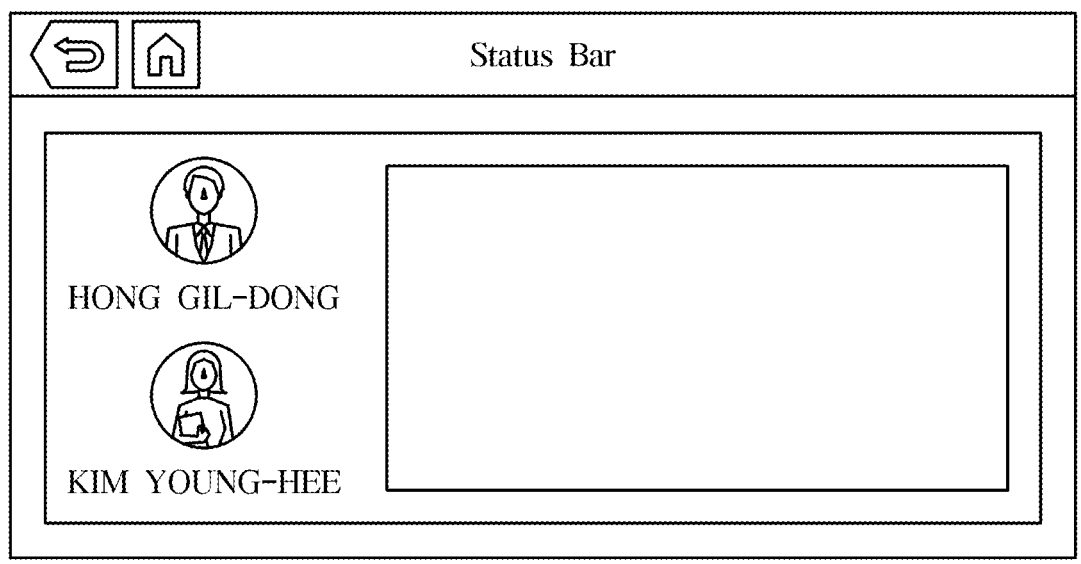

As shown in FIG. 7F, when the link to the second terminal 3 is completed, the first terminal 170 of the vehicle may display photos of all the users having the second terminal that may be linked to the vehicle 1, thereby allowing the user to easily access the user's account.

As is apparent from the above, according to the implementations of the disclosure, when initializing or newly registering an AVN terminal, or when changing settings of the AVN terminal, sharing of account information can be induced through membership registration and two terminals can be automatically linked to each other through sharing of the account information, thereby improving usability of the AVN terminal and the user terminal as well as user convenience.

According to the implementations of the disclosure, a user can conveniently use a remote service, thereby improving user's satisfaction.

According to the implementations of the disclosure, a quality, marketability and competitiveness of vehicle can be enhanced due to improved user convenience and satisfaction.

Implementations of the present disclosure can be stored in the form of a recording medium storing computer-executable instructions. The instructions may be stored in the form of a program code, and when executed by a processor, the instructions may perform operations of the disclosed implementations. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although implementations have been described for illustrative purposes, those skilled in the art will appreciate that various modifications, additions and substitutions are possible, without departing from the scope and spirit of the disclosure.

What is claimed is:

1. A terminal provided in a vehicle, the terminal comprising:
   a display;
   a communicator configured to communicate with a server and a user terminal; and
   a processor configured to:
      based on a user account information of a user being received from the server through the communicator, (i) control storing of the received user account information, (ii) control the display to display the stored user account information based on at least one of whether the user is present in the vehicle or whether a start command of the vehicle is received, and (iii) control linking of the user terminal based on the user account information,
      determine whether the start command has been received a set number of times, and
      based on a determination that the start command has been received the set number of times, request the server for the user account information.

2. The terminal of claim 1, wherein the processor is configured to determine whether the user is present in the vehicle based on one or more of a detection signal of an occupant detector, a door opening signal, or a door closing signal received through the communicator.

3. The terminal of claim 2, wherein the processor is configured to, based on determining that the user is present in the vehicle, determine whether the start command is received, and
   wherein the processor is configured to, based on determining that the start command is received, control displaying of the user account information.

4. The terminal of claim 1, further comprising an inputter, wherein the processor is configured to (i) based on an authentication request command being input through the inputter, transmit an authentication request signal corresponding to the input authentication request command to the server, and (ii) based on an authentication success information being received from the server, control the display to display authentication completion information.

5. The terminal of claim 4, wherein the processor is configured to, based on an authentication confirmation command being received through the inputter in response to displaying the authentication completion information, control linking to the user terminal.

6. The terminal of claim 4, wherein the processor is configured to, based on an authentication confirmation command being received through the inputter before the authentication success information is received from the server, control the display to display notification information about incomplete authentication.

7. The terminal of claim 1, wherein the processor is configured to (i) based on determining that the start command is received, determine whether the user account information is registered, and (ii) based on not determining that the user account information is registered, control the display to display a quick response (QR) code and guide information for guiding membership application.

8. The terminal of claim 1, wherein the processor is configured to, based on the linking to the user being completed, control the display to display a photo and user account information of at least one user that is linked to the vehicle.

9. The terminal of claim 1, wherein the user account information of the user includes at least one of a name, a contact number, a photo, or an email address of the user.

10. A terminal, comprising:
    an inputter;
    a display;
    a communicator configured to communicate with a server and a vehicle; and
    a processor configured to:
       control to store user account information of a user input through the inputter,
       control the communicator to transmit the input user account information to the server,
       based on an authentication request signal being received from the server, control the display to display authentication request information,
       based on an authentication command being received through the inputter in response to displaying the authentication request information, perform authentication about the user of the vehicle,
       control the communicator to transmit authentication information corresponding to a result of the authentication to the vehicle through the server, and
       based on the authentication request signal being received from the server, (i) compare received vehicle identification information and the input user account information with information stored in a memory of the server and (ii) determine whether the received vehicle identification information and the input user account information match the information stored in the memory of the server, to perform the authentication.

11. The terminal of claim 10, wherein the processor is configured to, based on a command to access a website being received through the inputter, (i) control accessing of the website and (ii) control membership registration on the website based on the user account information input through the inputter.

12. The terminal of claim 10, wherein the processor is configured to, based on a command to execute an application being received through the inputter, (i) control executing of the application and (ii) control membership registration through the application based on the user account information input through the inputter.

13. The terminal of claim 10, wherein the processor is configured to match and store vehicle identification information, transmitted from the server, with the user account information.

14. The terminal of claim 10, wherein the processor is configured to control the communicator to transmit the user account information to the server, based on initialization information of a vehicle terminal, provided in the vehicle, being received through the communicator.

15. The terminal of claim 10, wherein the processor is configured to, based on linking to the vehicle being completed, control the communicator to transmit, to the vehicle, information about a function that is being performed.

16. A server, comprising:
   a memory;
   a communicator configured to communicate with a first terminal provided in a vehicle and a second terminal; and
   a processor configured to:
      control the memory to store vehicle identification information of the vehicle received from the first terminal, and user account information of a user received from the second terminal,
      control the communicator to transmit the user account information to the first terminal,
      control the communicator to transmit an authentication request signal received from the first terminal to the second terminal,
      based on authentication information being received from the second terminal, control the communicator to transmit the received authentication information to the first terminal, and
      based on the authentication request signal being received from the second terminal, (i) compare the received vehicle identification information and the received user account information with information stored in the memory and (ii) determine whether the received vehicle identification information and the received user account information match with the information stored in the memory, to perform the authentication.

17. The server of claim 16, wherein the processor is configured to control the communicator to transmit the vehicle identification information, received from the first terminal, to the second terminal.

18. The server of claim 16, wherein the processor is configured to control the communicator to transmit notification information about incomplete authentication to the first terminal, based on an authentication confirmation command being received from the first terminal before the authentication information is received from the second terminal.

19. The server of claim 16, further comprising:
   an inputter configured to receive the user account information and transmit the user account information to the processor.

20. The server of claim 16, wherein the processor is configured to, based on an initialization information being received from the first terminal, (i) confirm the user account information linked to the first terminal and (ii) control the communicator to transmit the confirmed user account information to the first terminal.

\* \* \* \* \*